United States Patent
Lee et al.

(10) Patent No.: US 7,299,405 B1
(45) Date of Patent: Nov. 20, 2007

(54) METHOD AND SYSTEM FOR INFORMATION MANAGEMENT TO FACILITATE THE EXCHANGE OF IDEAS DURING A COLLABORATIVE EFFORT

(75) Inventors: Dar-Shyang Lee, Fremont, CA (US); Jonathan J. Hull, San Carlos, CA (US); Jamey Graham, Menlo Park, CA (US); Pamela Gage, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/521,252

(22) Filed: Mar. 8, 2000

(51) Int. Cl.
*G06F 17/00* (2006.01)
*G06F 15/00* (2006.01)
(52) U.S. Cl. .................. 715/500.1; 709/204; 704/500
(58) Field of Classification Search ............. 715/500.1; 709/204; 345/723, 758; 704/500
See application file for complete search history.

(56) References Cited

U.S. PATENT DOCUMENTS

| | | | |
|---|---|---|---|
| 4,578,718 A | 3/1986 | Parker et al. | |
| 4,686,698 A | 8/1987 | Tompkins et al. | |
| 4,787,063 A | 11/1988 | Muguet | |
| 4,905,094 A | 2/1990 | Pocock et al. | |
| 4,963,995 A | 10/1990 | Lang | |
| 5,091,931 A | 2/1992 | Milewski | |
| 5,164,839 A | 11/1992 | Lang | |
| 5,206,929 A | 4/1993 | Langford et al. | |
| 5,265,205 A | 11/1993 | Schroder | |
| 5,321,396 A | 6/1994 | Lamming et al. | |
| 5,475,741 A | 12/1995 | Davis et al. | |
| 5,491,511 A | 2/1996 | Odle | |
| 5,502,774 A | 3/1996 | Bellegarda et al. | |
| 5,530,235 A | 6/1996 | Stefik et al. | |
| 5,535,063 A | 7/1996 | Lamming | |
| 5,537,141 A | 7/1996 | Harper et al. | |
| 5,539,665 A | 7/1996 | Lamming et al. | |
| 5,596,581 A | 1/1997 | Saeijs et al. | |
| 5,610,841 A | 3/1997 | Tanaka et al. | |
| 5,673,016 A | 9/1997 | Lutes | |
| 5,686,957 A | 11/1997 | Baker ......................... 348/36 |
| 5,706,290 A | 1/1998 | Shaw et al. | |
| 5,717,869 A | 2/1998 | Moran et al. | |

(Continued)

FOREIGN PATENT DOCUMENTS

JP 403129990 6/1991

(Continued)

OTHER PUBLICATIONS

Rist, Thomas et al., Adding animated presentation agents to the interface, ACM International Conference on Intelligent User Interfaces, 1997, pp. 79-86.*

(Continued)

*Primary Examiner*—William Bashore
(74) *Attorney, Agent, or Firm*—Townsend & Townsend & Crew LLP

(57) ABSTRACT

A unique combination of components is disclosed to facilitate information management during a collaborative effort. Interaction during a meeting is supported by the use of devices in a manner that allows attendees to quickly retrieve and display documents on-command or automatically. The information includes previously recorded meetings among other things. The disclosed method and system, thus, facilitates the exchange of information during meetings.

47 Claims, 8 Drawing Sheets

U.S. PATENT DOCUMENTS

| | | | |
|---|---|---|---|
| 5,717,879 A | | 2/1998 | Moran et al. ............... 345/716 |
| 5,721,878 A | | 2/1998 | Ottesen et al. |
| 5,729,931 A | | 3/1998 | Wade |
| 5,734,719 A | | 3/1998 | Tsevdos et al. |
| 5,751,281 A | | 5/1998 | Hoddie et al. |
| 5,760,767 A | * | 6/1998 | Shore et al. ............... 345/723 |
| 5,764,789 A | | 6/1998 | Pare, Jr. et al. |
| 5,767,897 A | | 6/1998 | Howell |
| 5,793,365 A | * | 8/1998 | Tang et al. ................ 345/758 |
| 5,799,150 A | | 8/1998 | Hamilton et al. |
| 5,802,294 A | * | 9/1998 | Ludwig et al. ............. 709/204 |
| 5,845,261 A | | 12/1998 | McAlbian et al. |
| 5,854,831 A | | 12/1998 | Parsadayan et al. |
| 5,862,292 A | | 1/1999 | Kubota et al. |
| 5,946,654 A | | 8/1999 | Newman et al. |
| 5,978,477 A | | 11/1999 | Hull et al. ................ 358/403 |
| 5,986,655 A | | 11/1999 | Chiu et al. ................ 345/839 |
| 5,987,454 A | | 11/1999 | Hobbs |
| 5,990,934 A | | 11/1999 | Nalwa ....................... 348/36 |
| 5,991,429 A | | 11/1999 | Coffin et al. |
| 5,999,173 A | | 12/1999 | Ubillos |
| 6,008,807 A | | 12/1999 | Bretschneider et al. |
| 6,020,883 A | | 2/2000 | Herz et al. |
| 6,084,582 A | | 7/2000 | Qureshi et al. |
| 6,154,601 A | | 11/2000 | Yaegashi et al. |
| 6,154,771 A | | 11/2000 | Rangan et al. |
| 6,189,783 B1 | | 2/2001 | Motomiya et al. |
| 6,209,000 B1 | | 3/2001 | Klein et al. |
| 6,249,281 B1 | | 6/2001 | Chen et al. |
| 6,249,765 B1 | * | 6/2001 | Adler et al. ............... 704/500 |
| 6,332,147 B1 | * | 12/2001 | Moran et al. ............ 715/500.1 |
| 6,334,109 B1 | | 12/2001 | Kanevsky |
| 6,349,297 B1 | | 2/2002 | Shaw et al. |
| 6,369,835 B1 | | 4/2002 | Lin |
| 6,396,500 B1 | | 5/2002 | Qureshi et al. |
| 6,405,203 B1 | | 6/2002 | Collart |
| 6,469,711 B2 | | 10/2002 | Foreman et al. |
| 6,490,601 B1 | | 12/2002 | Markus et al. |
| 6,510,553 B1 | | 1/2003 | Hazra |
| 6,646,655 B1 | | 11/2003 | Brandt et al. |
| 6,728,753 B1 | | 4/2004 | Parasnis et al. |
| 6,779,024 B2 | | 8/2004 | DeLaHuerga |
| 6,789,228 B1 | | 9/2004 | Merrill et al. |
| 6,816,858 B1 | | 11/2004 | Coden et al. |
| 2002/0097885 A1 | | 7/2002 | Birchfield et al. |

FOREIGN PATENT DOCUMENTS

| | | |
|---|---|---|
| JP | 10-246041 | 9/1998 |
| WO | WO 02/013522 A2 | 2/2002 |
| WO | WO 02/058432 A2 | 7/2002 |

OTHER PUBLICATIONS

Product Description for Meeting Companion by Quindi Corporation, downloaded from <http://quindi.com/product.htm> on Jan. 24, 2005, copyright 2004.

Addlesee, M.D.; Jones, A.H.; Livesey, F.; and Samaria, F.S., "The ORL Active Floor," IEEE Personal Communications, vol. 4, No. 5, Oct. 1997, pp. 35-41. ftp://ftp.uk.research.att.com:/pub/docs/att/tr.97.11.pdf.

Cunado, D.; Nash, J.M.; Nixon, M.S.; and Carter, J.N., "Gait Extraction and Description by Evidencing Gathering," Proceedings of the Second International Conference on Audio and Video-based Person Identification, Washington, D.C., Mar. 22-23, 1999, pp. 43-48.

Eldridge, M.; Lamming, M.; and Flynn, M., "Does A Video Diary Help Recall?", Technical Report EPC-1991-124, People and Computers VII, eds. Monk et al., 1992, pp. 257-269.

Foote, J. et al. "An Intelligent Media Browser Using Automatic Multimodal Analysis," ACM Multimedia, 1998, pp. 375-380.

Girgensohn, A, and Boreczky, J.S. "Time-Constrained Keyframe Selection Technique," Multimedia Tools, 11(3): 347-358, 2000.

Konneker, L., "Automating Receptionists," Proceedings of the 1986 IEEE International Conference on Systems, Man, and Cybernetics, Atlanta, GA, Oct. 14-17, 1986, pp. 1592-1596.

Lamming, M.G.; and Newman, W.N., "Activity-based Information Retrieval: Technology in Support of Personal Memory," in F.H. Vogt (ed.), Personal Computers and Intelligent Systems. Proceedings of Information Processing 92, vol. III, Elsevier Science Publishers, 1992, pp. 68-81.

Lovstrand, L., "Being Selectively Aware with the Khronika System," Proceedings of the Second European Conference on Computer-Supported Cooperative Work, Kluwer Academic Publishers, 1991, pp. 265-277.

Newman, W.M.; Eldridge; and Lamming, M.G., "PEPSYS: Generating Autobiographies by Automatic Tracking," Proceedings of the Second European Conference on Computer-Supported Cooperative Work; Sep. 25-27, 1991, Amsterdam, The Netherlands, pp. 175-188.

Plamondon, R.; and Lorette, G., "Automatic Signature Verification and Writer Identification—The State of the Art," Pattern Recognition, vol. 22, No. 2, 1989, pp. 107-131.

Rangan, P.V. "Software Implementation of VCRs on Personal Computing Systems," IEEE, 1992, pp. 635-640.

Rangan, P.V. et al., "A Window-Based Editor for Digital Video and Audio," IEEE 1992 pp. 640-648.

Rosenschein, S., "New Techniques for Knowledge Capture," from TTI/Vanguard Conference: Knowledge Management Comes of Age, pp. 1-3, Sep. 23-24, 2003.

Seiko Instruments, Inc., "Smart Lobby: The Electronic Sign-In Book That Tracks Visitors and Prints Badges, User Guide for Windows," Manual Part No. 22-93000-00, copyright 1997.

Sony Music Corporation, "E-Guide Unmanned Reception System," Japan Industrial Journal, May 20, 1996, p. 6, (http://salmon.crc.ricoh.com:8001/hull/1999/8/11207/11207.html).

Viredaz, M.A., "The Ilsy Pocket Computer Version 1.5: User's Manual," Technical Note TN-54, Compaq Western Research Laboratory, Jul. 1998., pp. 1-37.

Want, R.; Hopper, A.; Falcao, V.; and Gibbons, J.J., "The Active Badge Location System," ACM TOIS, Transactions on Information Systems, vol. 10, No. 1, Jan. 1992, pp. 91-102.

* cited by examiner

METHOD AND SYSTEM FOR INFORMATION MANAGEMENT TO FACILITATE THE EXCHANGE OF IDEAS DURING A COLLABORATIVE EFFORT

BACKGROUND OF THE INVENTION

The present invention relates generally to information management and more particularly to multi-media-based, real-time, interactive information management for supporting collaborative interaction among a group of participants.

In any project involving a group of people, cooperative and coordinated interaction typically is key to the success or failure of the undertaking. The project begins with a series of meetings to identify the desired goals, and to begin understanding the tasks needed to achieve the goal. Numerous meetings subsequently follow to further identify how to achieve the desired goals. In an engineering setting, for example, this typically involves teams of engineers holding several meetings to understand the technical hurdles they face, and to develop and design the components which constitute the end product. In a marketing situation, product managers and sales persons convene frequently to define the product line or services, to identify potential markets and target customers, to develop advertising strategies and product roll-out scenarios, and so on.

As a project continues along, various groups of the project team will have periodic meetings to address and resolve issues and problems which inevitably arise during the course of any significant endeavor. Meetings will take place to assess the progress of the project, to assess the scope of the effort in view of changing external conditions, to re-order priorities and so on.

Sometimes, the meetings are difficult to convene. For example, engineers from various offices in geographically distant locations might need to participate. Certain members may not be conveniently available; e.g. they are on the road at a customer site.

The creation and dissemination of information is often inefficiently managed. Conventionally, attendees in a meeting record the events of the meeting by taking notes, whether handwritten, or entered in a portable computer such as a laptop computer, or entered into a personal data accessory (PDA), or by video taping the meeting. Notes of the meeting events are recorded from the point of view of the observer. Consequently information that is omitted and retained will be a function of the experiences and understandings (or misunderstandings) of the observer. In addition, note taking activity tends to distract from the discussion taking place, and so it is possible that certain points of interest might be missed.

Such inefficiencies of information management are exacerbated when in so-called "brainstorming sessions," when ideas are presented at a quick pace and many trains of thought are produced. Participants generally stop taking notes at that point, being frustrated by the flurry of information being presented. The situation is further aggravated for those attendees who are at remote locations, being unable to fully participate in the session.

Documentation may not always be readily available. For example, a topic may arise which was unexpected and for which the relevant materials are not at hand. This creates inefficiency because another meeting must then be scheduled with the risk that the needed participants may have conflicting schedules. At other times, the meeting may need to be stalled until needed material is obtained.

Notes and ideas developed from previous meetings are not always available. The shear volume of information accumulated over the course of many meetings may require the expenditure of much human effort to sort through the material and to render it in a readily accessible form. A problem, of course, is that one cannot know a priori what information will be relevant in subsequent meetings. Consequently, a fully cross-referenced index is desirable, but tedious and typically not made.

Although computers have tremendously improved document management and workflow process in many business settings, there has been very poor computer support for the creative and intellectual activities which take place in meetings and brainstorming sessions in the work environment. Means for capturing these events is important not only for preserving corporate knowledge, but also for facilitating the dissemination of ideas and the assimilation of information. With the availability of ever-increasing processor speed, communication bandwidth, and storage capacity, overcoming the technical impediments are no longer an issue. Instead, the effective coordination and utilization of vast amounts of information generated when individuals collaborate toward a common goal become the challenge.

A need therefore exists for a method and system to provide information support services during a meeting. It is desirable to provide a method and system which can effectively capture the events of the meeting. There is a need to provide access and retrieval of information that can facilitate the progress of the meeting. It is further desirable to provide these capabilities with minimal human intervention so as not to distract the participants in the meeting.

SUMMARY OF THE INVENTION

An information support system in accordance with the invention facilitates the management information during a meeting. Information retrieval and other management functions are provided during an ongoing meeting. The meeting participants are alleviated of the distracting tasks of manually accessing the information, having to delay topics of discussion while certain documents must be manually retrieved, and so on.

In accordance with the invention, a method and system for managing information during a meeting includes recording the activities of the participants in a meeting during the meeting. A participant directive is identified by analyzing the recorded meeting data. The participant directive represents a desired action on certain information. In response to the participant directive, the desired action is acted upon. The participant directive is determined by an analysis of the textual content of the recorded meeting data. The directive is either an explicit command issued by a participant or is implicitly determined based on the context of the meeting.

Data interaction devices are provided for participants to interact with the data and to provide commands and other input to the information support system. In one embodiment, attendee identification capability is provided. Information access and presentation is based on the access permissions associated with the identified attendees. In another embodiment, attendee location tracking is provided. Information access and presentation is based on the location of the attendees, in addition to the associated access permissions.

DESCRIPTION OF THE SPECIFIC EMBODIMENTS

Figure 1:
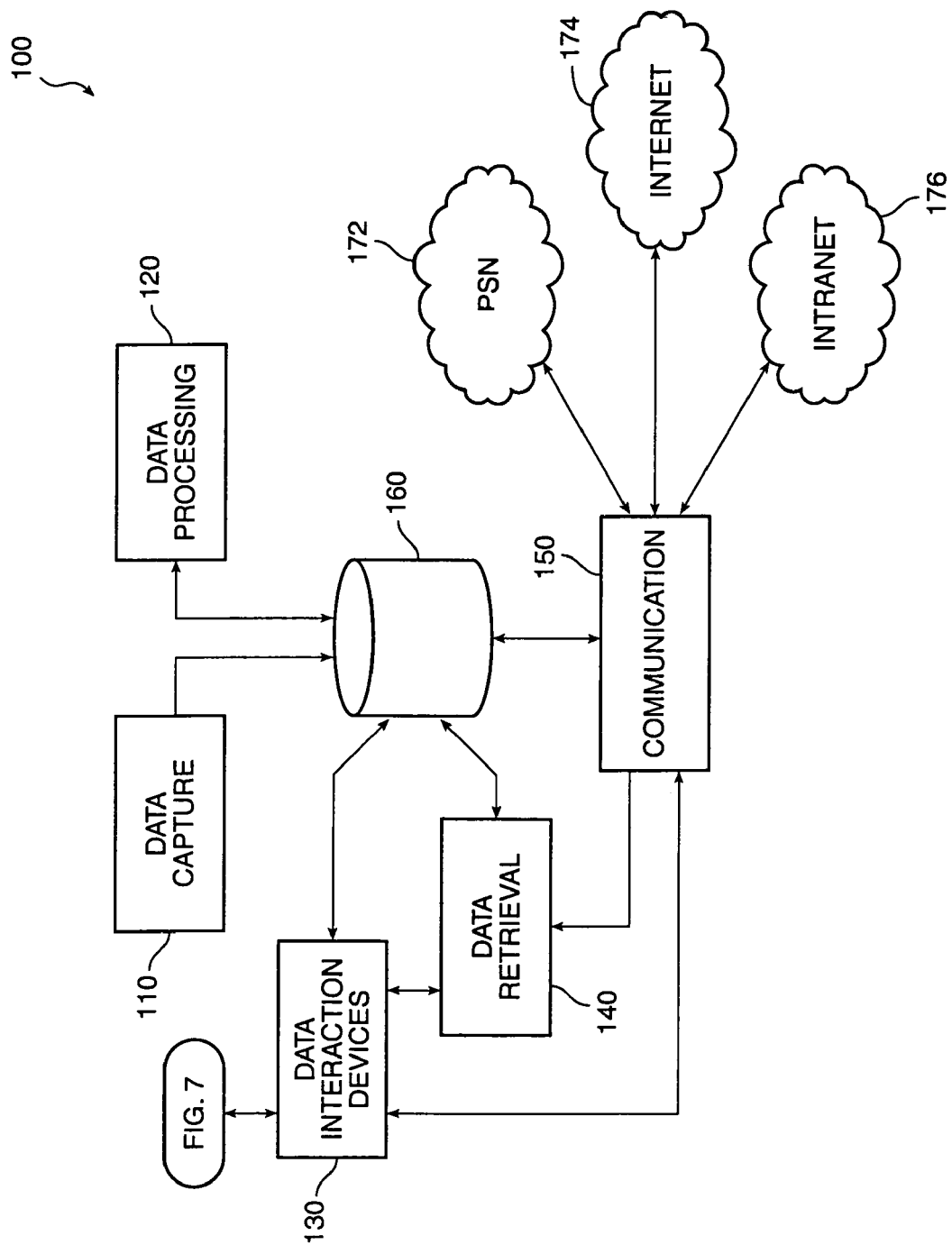
FIG. 1 is a simplified block diagram of an embodiment of the present invention.

FIG. 1 is a simplified block diagram of an embodiment of the information support system 100 in accordance with the present invention. The information support system includes a database component 160. A data capture portion 110 in data communication with database component 160 feeds data captured during a meeting to the database. A data processing portion 120 processes data contained in the database component 160. A data interaction component 130 comprises data interaction devices by which members in a meeting exchange information with database component 160. A data retrieval portion 140 provides a second data path between data interaction component 130 and database component 160. A communication portion 150 provides access to various communication networks 172-176.

Data capture portion 110 comprises various devices for recording the events and information produced during a meeting. Video recordings are produced and stored in database component 160. Video recordings include videos of the participants in the meetings, presentations made during the meeting, written information produced by the attendees, and so on. Audio recordings are also made and stored in the database component. Data capture portion 110 further includes document capture.

Data processing portion 120 comprises computer programs configured to analyze data contained in database component 160. More specifically, there are computer programs for extracting information contained in the video and audio recordings. The information includes text and images which are also stored in the database component. There are computer programs which allow a user to access selected segments of the various video and audio recordings contained in the database component.

Data interaction component 130 comprises various input/output devices for use by the members of a meeting. The devices allow access to various information contained in database component 160. Members are able to view the information, both textual and graphical. Selective distribution of information is provided. There is the ability to create new information by assimilating pieces of existing information. Members in the meeting can even modify certain pieces of information, depending on privilege levels, the type of information, and so on.

Data retrieval portion 140 comprises various computer programs configured to retrieve information from database component 160. There are computer programs to search for and present relevant documents based on information captured by data capture component 110. The data retrieval portion is in data communication with the interaction devices of data interaction component 130 to obtain cues from the attendees of the meeting to determine when and what information to retrieve. Retrieved documents are then displayed via data interaction component 130.

Communication portion 150 provides channels of communication to various communication networks. A public switched network 172 provides access via conventional telephone lines to remote modems, fax machines, and the like. In one embodiment of the invention, public switched network 172 includes a private branch exchange ("PBX") in front of it. A global communication network 174, such as the Internet, provides access to various information sources, such as the world wide web ("web"), news groups, and so on. Typically, public switched network 172 and global communication network 174 share the same physical channels. However, the logical view shown in FIG. 1 is presented to simplify the discussion. Communication portion 150 also can be provisioned with access to a local communication network 176, such as an intranet, local area network ("LAN"), wide area network ("WAN"), and so on.

Communication portion 150 comprises the hardware and software conventionally used to access the various communication networks. For example, access over public switched network 172 is typically accomplished with a modem. Access to global communication network 174 can be by way of a modem, a digital subscriber line ("DSL"), an integrated services digital network ("ISDN") connection, cable modem, and the like. Local communication network access is typically via an Ethernet connection.

Database component 160 is a back-end database which stores documents and multi-media data produced during the meeting. The database includes records from previous meetings. Preferably, database component 160 comprises a data server system. This permits remote access to the database over a communication network. This also permits documents and information contained on the web and other such information sources to be continuously available. Database component 160 comprises conventional hardware and software to provide the functions of a database. In one embodiment, the database is implemented as a relational database using conventional structured query language ("SQL") techniques for accessing data. The data is stored on a disk system configured as a redundant array of individual disks ("RAID") to provide high-speed access to the stored data with backup capability. In another embodiment of the invention, the data repository is the $IM^3$ and/or the eCabinet™ products manufactured and sold by the assignee of the present invention.

Figure 2:
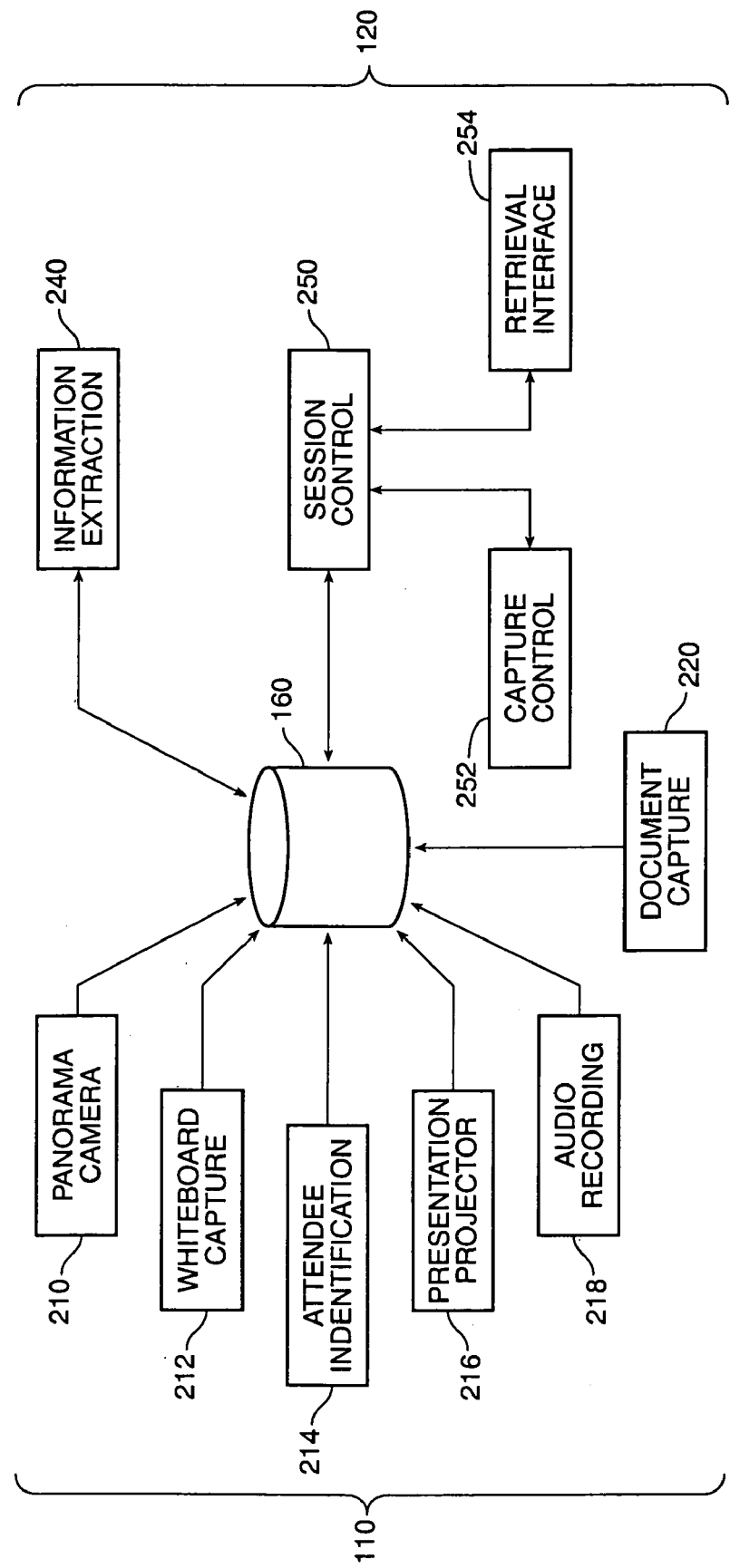
FIG. 2 shows an exemplary list of various capture devices and some of the data manipulation and control elements of FIG. 1.

Referring to FIG. 2, various data capture devices and related controls in accordance with the invention are exemplified in block diagram format. A panoramic camera component 210 provides a video recording of the participants of the meeting. A whiteboard capture portion 212 includes hardware and software to capture the writings made upon the whiteboard and to store the captured information to database component 160. An attendee identification system 214 identifies participants as they enter and leave a meeting. A presentation projector component 216 allows participants to present slides during a meeting. An audio recording component 218 provides an audio record of the meeting. A document capture component 220 provides data capture capability of documents used during the meeting.

FIG. 2 also shows the data processing portion 120 of the information system 100 of FIG. 1. The data processing portion comprises an information extraction portion 240 which includes computer programs to analyze the data contained in database component 160. A session control module 250 provides selectively controlled access to the capture devices and to the captured data. The session control module comprises a capture control portion 252 and a retrieval interface portion 254.

Panoramic camera component 210 comprises a panoramic video capture device. A company called Cyclo Vision Technologies, Inc. sells an attachment comprising a parabolic mirror, relay lens, and PC-based software to produce panospheric views. The attachment is adapted for a variety of commercially available digital cameras, including the following models: the Agfa ePhoto 1680 from Agfa; the Nikon CoolPix 950, 900, & 700 models from Nikon, Inc.; the Kodak DC 265, & 260 models from the Eastman Kodak Company; the Olympus C-2000 from Olympus America, Inc.; and the Epson PhotoPC 750Z from Epson America, Inc. An adapted camera produces a warped image due to the parabolic mirror, but which nonetheless contains a 360° image. The software re-samples the digital image to produce a de-warped image. The image can then be panned or zoomed by the software. Panoramic camera component 210 is in data communication with database component 160 to which the de-warped image is delivered for storage. Preferably, the warped image is also stored in database component so that additional processing on the raw data can be made as needed.

Another company called Be Here Corporation manufactures a similar system. Other panoramic systems produce an integrated image by stitching together a series of sequential images. U.S. Pat. No. 5,990,934 describes such a technique and is herein fully incorporated by reference for all purposes. In an embodiment of the invention, two or more such cameras in the meeting room are provided to generate the video information necessary to produce 3-dimensional images.

Whiteboard capture portion 212 typically comprises one or more conventionally known electronic whiteboards configured to capture notes and diagrams that are written thereupon during a meeting. Preferably, in accordance with the present invention, color information is captured along with the written information. Each whiteboard device is coupled to database component 160 to store the captured information. In one embodiment, a whiteboard drawing reaches a stage that needs to be recorded, a meeting participant pushes a button, and the device uploads the captured information to the database. In another embodiment, data is continuously captured and delivered to database component 160.

In yet another alternative embodiment, existing non-electronic whiteboards is retrofitted with x-y location devices. The x-y location device tracks the movements of the pen which represent the written matter, sketches, notes, and so on. The x-y information is then stored to the database. In still yet another alternative, a video camera is provided to record the writings.

Attendee identification system 214 includes a badge worn by the participants of the meeting. In one embodiment, a visitor is given such a badge upon arriving. Preferably, the badge contains a wireless identification device to permit unobtrusive identification of the participants. For example, the identification badge might conform to the wireless standard known as Bluetooth. This standard uses an unregulated part of the spectrum between 2.4000 GHz-2.4835 GHz, known as the industrial-scientific-medical ("ISM") band. The Bluetooth standard defines a standard operating range of 10 meters, but in practice can be extendable beyond that range. In addition, Bluetooth does not require line-of-sight communication. This has the advantage being able to receive signals from the badges worn by the participants without artificially restricting their movement.

Presentation projector component 216 comprises, in one embodiment, a conventionally known slide projector for presenting prepared material such as slides and the like. The projector includes an image capture capability, having optics which direct and project a presented image upon a charge coupled device ("CCD") array, in addition to a projection screen. On-board logic reads out the CCD array and delivers it to database component 160. Alternatively, the on-board logic includes a serial or parallel port configured for use with a personal computer ("PC"). The PC reads out the data which then uploads it to the database.

In another embodiment, as an alternative or addition to a projection unit, a PC or more typically, a notebook (laptop) computer, is provided with presentation software. For example, a commonly available presentation package is PowerPoint, sold by Microsoft Corporation. The software enables the production of a slides and their presentation. The computer is typically provisioned with a video adapter which produces a National Television System Committee ("NTSC") or video graphics adapter ("VGA") compliant signal. The signal is fed into the video input of a television or computer monitor for presentation in the meeting. The output is tapped, digitized, and uploaded to the database component. In yet another embodiment, presentation projector component 216 is some combination of standard projectors and portable notebook computers.

Audio recording component 218 typically comprises multiple microphones. In one embodiment, the microphones are located about the meeting or conference room. Source localization and selective amplification can be achieved by proper placement of the microphones. A minimum of two microphones can indicate the direction from which sound emanates. In another embodiment, three microphones are provided to produce a recording which contains elevation information in addition to direction. Preferably, any one of a number of known echo cancellation techniques is additionally provided to improve the quality of the recorded audio. The audio component includes a digitizing portion to convert the analog signal to a form that can be stored in database component 160.

Document capture component 220 comprises various systems for converting hardcopy documents into electronic form for storage in database component 160. Conventionally, this is directly achieved by the use of scanners, including flatbed scanners and handheld models. A more transparent collection method is to integrate the capture capability into devices such as printers, copiers, fax machines, and so forth. U.S. Pat. No. 5,978,477 assigned to the assignee of the present invention discloses precisely such a technique and is fully incorporated herein by reference for all purposes.

Figure 6:
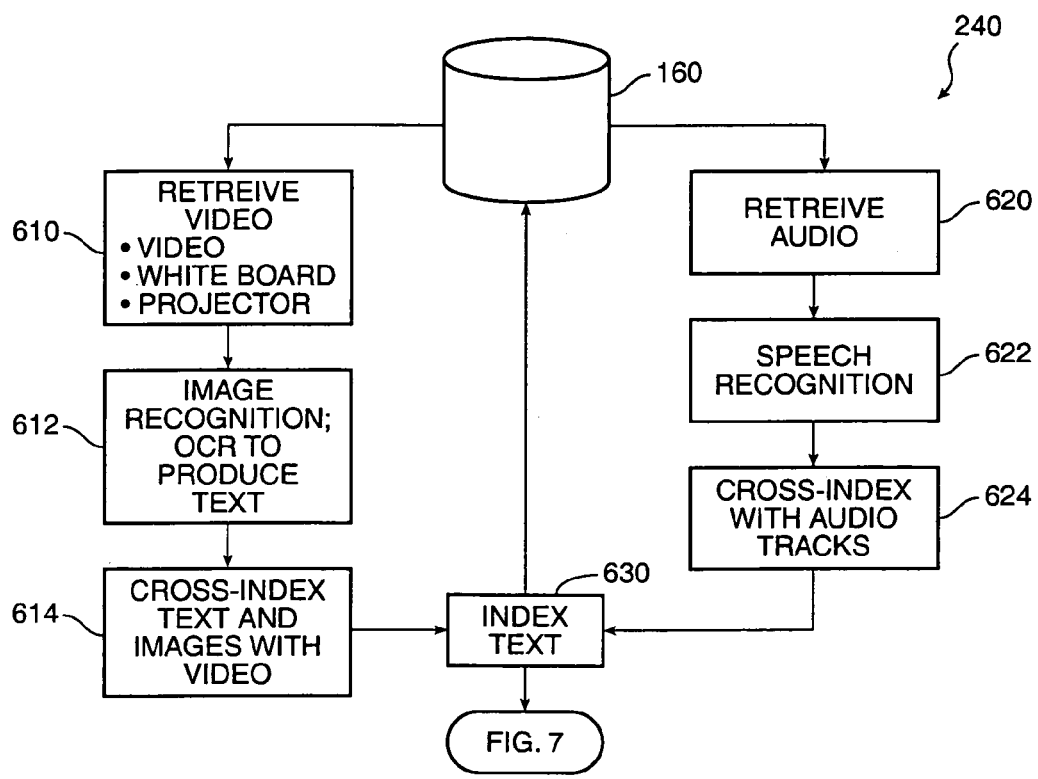
FIG. 6. is a high level flow of the text retrieval process of the present invention.

Information extraction portion 240 comprises computer programs configured to extract text and images from the captured data. Referring to FIG. 6 for a moment, it can be seen that information extraction portion 240 comprises two primary data flow segments. Video recordings are analyzed for text and images. In step 610, video images are read out of database component 160. This includes video and image recordings made by panoramic camera 210, whiteboard capture portion 220, and presentation projector component 216. Data from panoramic camera 210 is analyzed for images contained in the recording. For example, a vendor might bring some samples of a product. The samples can be recorded, and later identified and stored for future recall based on the identification. In step 612, image analysis of the video identifies the samples and stores them in the database for reference. Similarly, textual information picked up in data from the whiteboard and the presentation projector components, and to a lesser extent in the video recording, is analyzed using known optical character recognition techniques. In step 614, the text and images are cross-referenced with the video and stored in the database. By providing the cross-referencing back to the original video, it is then possible to call up the portion of video for a given image or given segments of text. In step 630, the text that is extracted is indexed and stored into the database. In addition to individual words, groups of words such as phrases and sentences can be indexed to enhance context searching discussed below in connection with FIG. 7.

Audio recordings are treated in a similar manner. In step 620, segments of audio tracks are retrieved. In step 622, known speech recognition techniques are applied to extract text from the audio segments. The identified text is cross-indexed with the audio tracks in step 624. This allows relevant portions of the audio to be called up for a given segment of text. In step 630, the text identified in the audio tracks is indexed and stored into the database. In addition, to single words, phrases and sentences can be indexed to enhance context searching discussed below in connection with FIG. 7.

Session control module 250 comprises computer programs which mediate access to the capture devices and to the captured data. The data capture devices can thus be controlled from a single station in the conference room, or remotely controlled in situations where some of the participants are at remote locations. This permits real-time broadcasting or offline playback, and so on. The session control module mediates multiple users and coordinates (and limits) their access to the capture devices and captured data. The selective control and access functions are provided depending on the user.

Capture control portion 252 comprises the various interfacing components which access the control functions of the various capture devices. In accordance with the present invention, capture control portion 252 provide basic functions such as starting and stopping the data capture function of one or more data capture devices. It is worth noting that some data capture devices may not be equipped for remote control access by capture control portion 252, in which case manual operation of those devices is required. However, some devices can be remotely controlled by wireless techniques or wired connections, for example an Ethernet connection. Such devices might have additional remote operation control capability accessible by the capture control portion. For example, hue and color balance controls in a video camera might be remotely available to capture control portion 252. Depending on session control module 250, all, some, or none of the control functions are available for any one given participant attempting to access those functions.

Session controller module 250 can establish levels of access by a login process. For example, visitors might not be given any access or very limited access. A system administrator might be given complete access.

Retrieval interface 254 provides access to the captured data to review (playback) and/or edit the material. Retrieval interface 254 preferably is based on graphical user interface design principles, since the nature of the captured data for the most part comprises video and still images.

Figure 3:
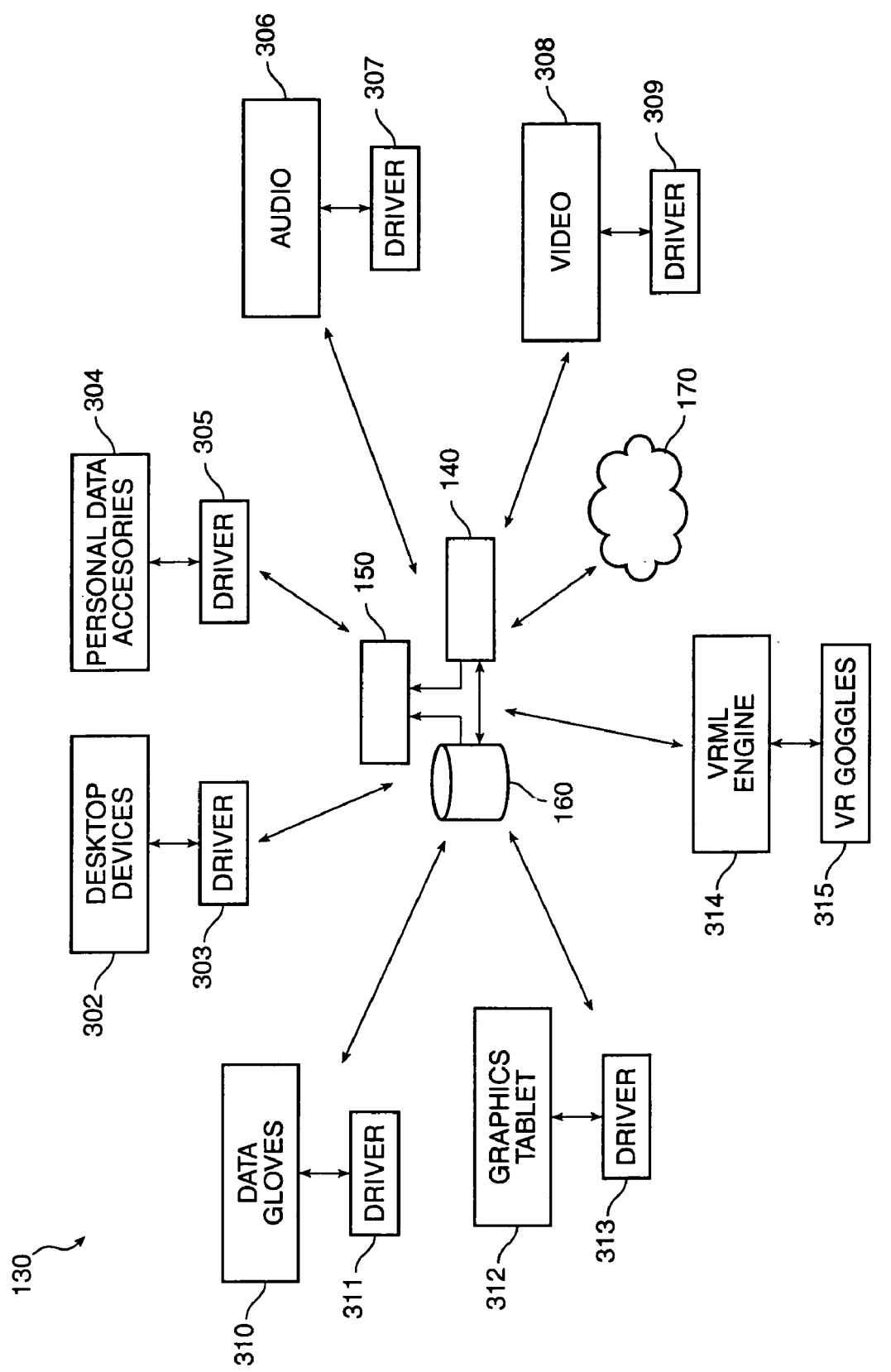
FIG. 3. shows an exemplary list of data interaction devices of the present invention.

Referring to FIG. 3, various data interaction devices are exemplified. The data interaction devices are another source of information which feeds into database component 160. In addition, the data interaction devices provide the function of data presentation to the users. Each data interaction component includes related "drivers," which are computer programs configured to provide a common interface between the specific hardware and internal software or firmware constituting a particular data interaction device and the external computing environment. As can be seen in FIG. 3, the computing environment that is external to the data interaction devices comprises database component 160, data retrieval portion 140, and communication portion 150. Communication portion 150 provides access to the various communication networks shown in FIG. 1 and generally represented in FIG. 3 by communication bubble 170.

Desktop devices 302 and associated drivers 303 provide access conventionally used by users of PCs. Desktop devices 302 include a display, a keyboard, and a mouse or a stylus. Data is input via the keyboard and displayed on the monitor. Monitors include flat-panel displays, larger units for large-scale presentations, and so on. The mouse typically provides the functions of: action selection; data selection; and action initiation. Desktop devices also include handheld devices and laptop computers.

Personal data accessories 304 and associated drivers 305 provide a portable and convenient store for personalized data such as schedules, address books, and so on. These devices typically have interfacing software to synchronize the stored information with a computer. In accordance with the invention, personal data accessories are interfaced with database component 160. This allows a meeting participant to upload her schedule and other pertinent information to be shared by others. An example of a personal data accessory is the Palm V, manufactured and sold by 3COM Corporation.

Audio component 306 and associated drivers 307 provide a speech command interface for accessing information contained in database component 160. Speech recognition systems are known. In one embodiment, documents are retrieved simply by speaking the action and the name of the document. Similarly, internet access and "surfing" on the net by visiting plural web sites are achieved over the speech command interface. In another embodiment, audio component 306 includes a speech synthesis portion to provide audio "readout" of documents to the participants in the meeting. Speech synthesis would be especially useful for the visually impaired. The synthesized speech is broadcast over a loudspeaker system or over headphones.

Video component 308 and associated driver 309 include personal display systems such as displays adapted to be worn like eyeglasses. Virtual reality goggles 315 are 3-dimensional imaging tools which can be used to provide stereographic imagining. A virtual reality engine 314 generates the virtual images. Virtual reality markup language ("VRML") can be incorporated to define the 3-dimensional elements and their interactions.

Data gloves 310 and associated drivers can be used to enhance the virtual reality experience. Combined with the virtual reality goggles, a user is given the ability to manipulate virtual objects. Meeting participants equipped with virtual reality goggles and data gloves can cooperate in a virtual reality environment. Data gloves having tactile and force feedback features can be used to provide the user with additional information.

A graphics tablet 312 and associated driver 313 provides for situations in which freehand sketches need to be captured. Conventional mouse input devices are not appropriate for handwritten material. Signature capture would be facilitated by the use of a graphics tablet where signed documents are needed.

Figure 4:
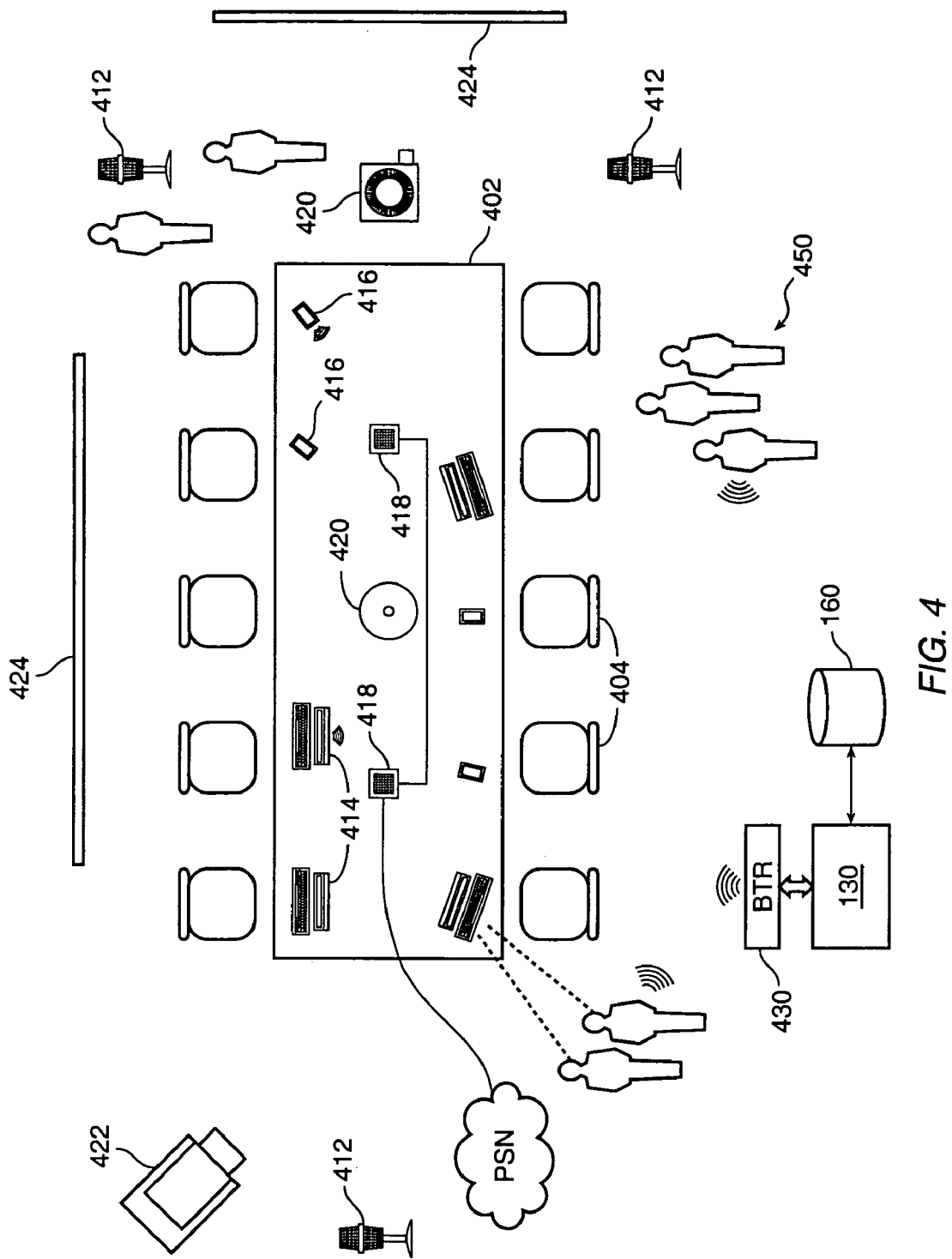
FIG. 4 illustrates an embodiment of a typical arrangement of some of the elements comprising the present invention.

Refer now to FIG. 4 for an illustration of a typical meeting room configuration in accordance with the invention. It is noted that the figure is purely exemplary and is not intended to limit the scope of the invention. There is a conference table 402 having plural chairs 404 arranged about it. A panoramic camera 410 captures a panoramic view of the events taking place in the meeting. As mentioned above, additional cameras (not shown) can be provided to generate 3-dimensional images.

Arranged atop conference table 402 are various data interaction devices. Computer displays and keyboards 414 are provided. Personal data accessories 416 are also shown. A pair of speakerphones 418 allow for teleconferencing. A printer 422 is shown.

Various data capture devices include whiteboards 424 for sketching ideas and so forth. Microphones 412 are arranged about the room to capture the audio. Speakers (not shown) may also be provided for audio playback. Audio headphones (not shown) can be provided for unobtrusive audio. A projector 420 is provided for slide presentation.

The data capture and data interaction devices can be connected using conventional wired techniques. As mentioned above, serial connections, parallel cabling, Ethernet wiring and other wired standards are contemplated. Preferably a wireless approach is used whenever available, in order to simplify the setup and to avoid excessive cabling within the conference room.

Two wireless standards are commonly available. The Infrared Data Association (IrDA) specification specifies an infrared wireless communication standard. Personal data accessories typically use this medium for communicating data between units. Keyboards are available with an infrared interface. Certain operating limitations, however, make IrDA devices less than ideal. IrDA provides a range of up to a meter or so and has a working range of about 30°. Increasing the operating range involves increasing the power output of the infrared signal, thus presenting certain hazardous conditions to the operators.

As mentioned above, the Bluetooth wireless standard is preferable, especially since line-of-sight is not required between two communicating devices. Various devices are shown equipped with a Bluetooth interface; such as personal data accessories 416. It is understood that other devices can be similarly equipped. A Bluetooth transmitter/receiver provides a data path between the devices and database component 160. In fact, data over the communication network 170 can be provided through this data path.

The data rate for Bluetooth is 1 Mbps (megabits per second), as compared to IrDA which is 4 Mbps. However, for most circumstances a 1 Mbps data rate is sufficient. Where higher data rates are needed, such as in the case of video transmissions, another wireless standard known as IEEE 802.11b can be used. IEEE 802.11b provides higher data rates, up to 11 Mbps. Moreover, the standard defines operating distances of 30 meters. The choice of wireless standards, of course, will depend on commercial availability, cost factors and the like, for any given conference room configuration.

Figure 5:
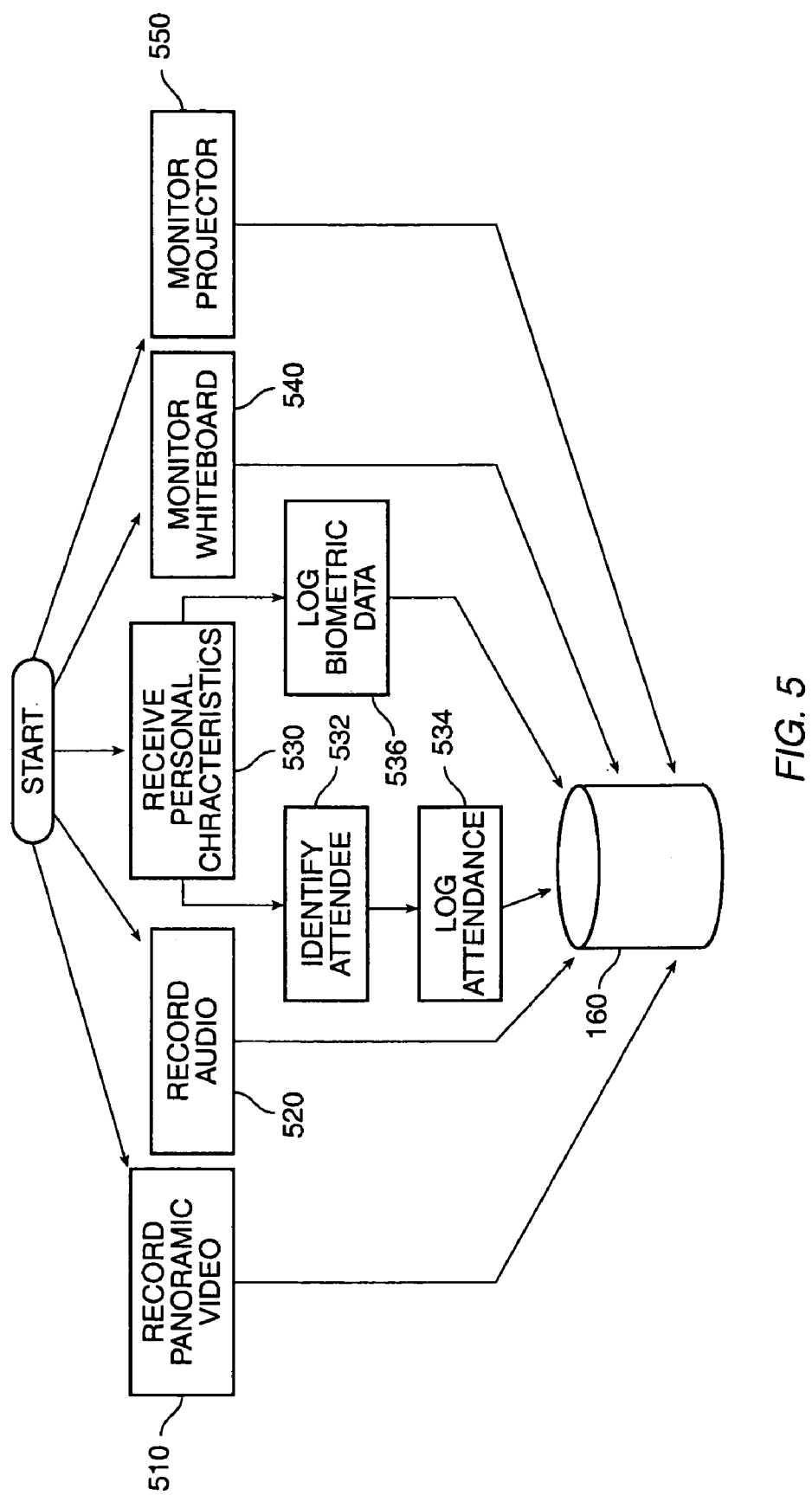
FIG. 5 illustrates the processes of the present invention.

Referring now to FIG. 5, it is shown that various processes associated with the foregoing data capture devices are initiated and execute continuously for the duration of a meeting. It is noted that for silent moments during the meeting data is not generated, though the process may be executing. A record video process 510 continuously collects data from the one or more cameras comprising panoramic camera component 210. Likewise, a record audio process 520 continuously collects data from the one or more microphones comprising the audio capture component 218. A whiteboard monitor process 540 monitors the activity occurring at each whiteboard. In one embodiment, whiteboard data capture occurs continuously as the user writes. In an alternative embodiment, data capture occurs on-demand, upon receiving a user's directive such a vocal command or the push of a button. Projector monitoring process 550 monitors the presentation of slides and captures the slide data each time a new slide is presented.

A process 530 for receiving personal characteristics of the attendees in a meeting includes a continuously executing process 532 for identifying each attendee. This process includes receiving data from the identification badges worn by everyone. In one embodiment, a visiting attendee's presence is logged 534 upon entering the premises. This can take place, for example, at a receptionist's desk when the badge is initially issued. In another embodiment, a frequent visitor may have a permanently issued badge. A sensor at each entrance detects the visitor's ingress and egress and logs the activity to the database. In a co-pending application U.S. patent application Ser. No. 09/714,785, filed Nov. 15, 2000, entitled "A NETWORKED PERIPHERAL FOR VISITOR GREETING, IDENTIFICATION, BIOGRAPHICAL LOOKUP AND TRACKING" and owned by the assignee of the present invention, such an automated identification system is disclosed whereby a visitor's proximity to a visitor kiosk enables the system to detect and log her presence. In another embodiment, a biometric data logging function 536 is provided in addition to attendance logging. For example, identification can be based on chromatic information and facial features of an attendee's image. Identity verification can be made at a receptionist's desk or at a visitor kiosk when a visiting attendee arrives.

In yet another embodiment, biometric data logging process 536 includes location tracking capability. Multiple audio inputs are provided to allow for triangulating the location of each user. Alternatively, multiple Bluetooth receivers provide the triangulation data by noting the time differential between signals received from a user as she moves about the room. Knowledge of an attendee's location permits the information support system to route displayed information proximate her location. For example, a capture device (e.g., microphone sensitivity) is adjusted as a user moves about the room. As another example, if an attendee moves from one meeting room to another meeting room, any relevant information being provided to her is automatically relocated. Used in conjunction with the other identification aspects, certain sensitive data can be selectively displayed depending on who is in a particular room and what their access privileges are. More generally, the actions permitted can be made dependent on the location of an attendee and the other members in the vicinity of the attendee.

Figure 7:
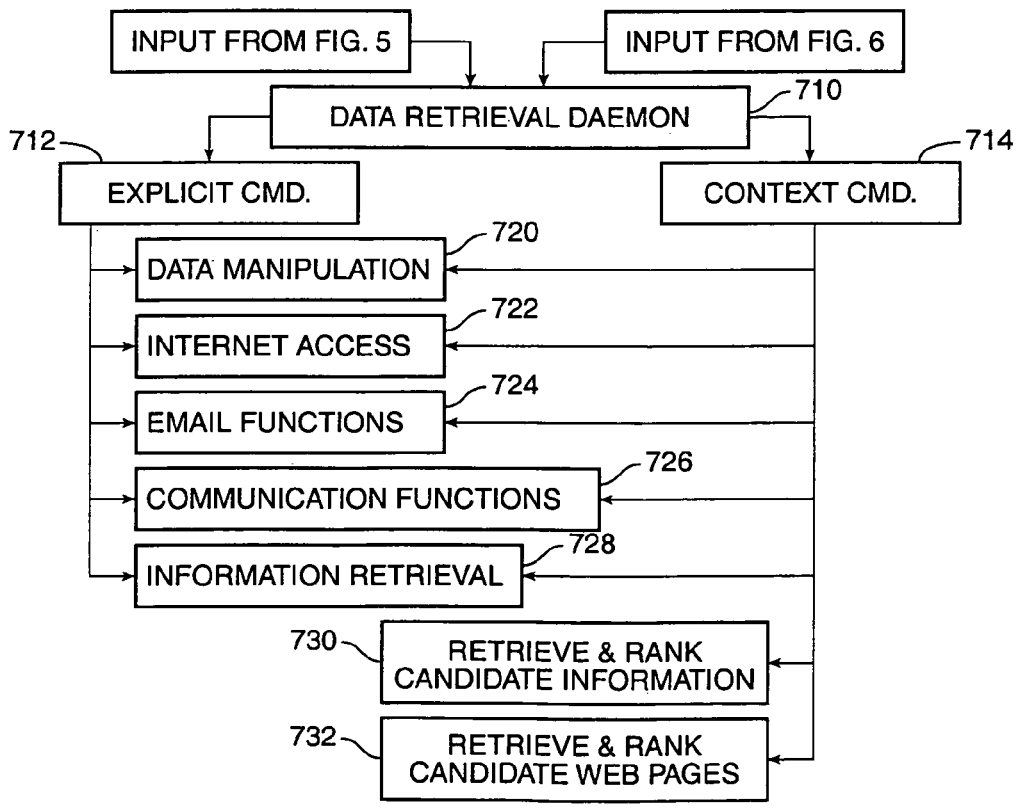
FIG. 7 is a high level flow of the data retrieval process of the present invention.

Referring to FIGS. 5-7, data provided by data capture portion 110 and data interaction component 130 contain various cues which are discovered by the monitoring processes outlined in FIG. 5. These cues are fed to a data retrieval daemon 710. Similarly, text extracted by the processes shown in FIG. 6 feed into data retrieval daemon 710. The data retrieval daemon comprises various continuously executing programs which provide information services to support a meeting in response to the various cues detected during the meeting.

There are cues which are explicit directives from the participants in the meeting. For example, data manipulation services 720 include document management activities such as file editing, file renaming, and file creation and deletion. On-demand internet access 722 is provided. Various messaging functions 724 are available to the members of the meeting, including electronic mail, voice over internet capability, message posting on the internet and in newsgroups, and the like. Communication functions 726 allow members to establish conference calls, connect to remote members, and so on. Information retrieval services 728 permit meeting members to access documents, meeting schedules, previously captured meetings, and so on. Typical cues include commands received from the voice command interface and commands entered from a keyboard or written on a whiteboard. The virtual reality generator can provide a virtual input interface through which user commands can be issued. Typical explicit commands include actions such as accessing a particular web page, composing email and specifying a list of recipients, and so on.

In accordance with the invention, data retrieval daemon 710 processes implicit cues to provide information services in a context-driven manner. Implicit cues are inferred from the context of the meeting and do not result from a participant issuing a command. Thus, an explicit command might be "COMPUTER, display April shipping orders." An implicit information retrieval cue might be issued indirectly when a speaker mentions the name of a document, but does not call out to actually retrieve it. The data retrieval daemon, continually monitoring the video and audio recordings and using information provided by the processes outlined in FIGS. 5 and 6, makes such determinations. For example, data retrieval daemon 710 knows that a certain speaker is a visitor. By accessing the visitor's meeting schedule, the data retrieval daemon can access the web or some other information source for traffic conditions or transportation schedules and provide the information to the visitor at an appropriate time.

As another example, data retrieval daemon 710 can be programmed to act on the detection of certain keywords or phrases. In response, the web can be accessed and a search made to pull up whitepapers, companies, or other such information for the participants of the meeting.

In addition to the services discussed above, context-driven searches 730, 732 proceed in the background. The information, whether stored in database component 160 or obtained over the web, is accumulated and ranked for relevance. As additional context is received, a further refinement of the search criteria is made to update candidate information. At the appropriate time, the information can be presented.

There are several ways in which meeting content can be used to retrieve relevant documents for real time feedback. For example, the audio transcription of a meeting within a time window, either from the beginning of the meeting to the current time, or within sliding time frame, can be used as query input. A single input can be formed collectively from all participants or separate tracks can be allocated to each speaker. Given a window of such text input, many conventional information retrieval techniques can be applied.

Typical preprocessing techniques including stop word removal, stemming, morphological analysis, are applied first. Then, content words are identified based on the word frequency difference between the input text and English norm. Documents in the database are scored by how many content words they contained, possibly weighted by other factors such as how many other documents also contain a given content word. Finally, documents are ranked according to their scores on a given set of query words. The result may contain a fixed number of top ranked documents or a variable number of documents based on a threshold on the score. Of course, spoken input is very unstructured and noisy due to speech recognition errors. Techniques are know which can compensate for significant levels of errors.

It is possible to provide a set of predetermined topics. The transcribed text in a time window can be classified to one of these topics using known document classification techniques. Typically, a single profile of word frequencies is computed for all documents belonging to the same category. To classify a new document, the word frequency profile of the new document is compared to the profile of each category. The document is classified to the category whose profile is most similar, and the profile for that category is then recomputed to reflect the inclusion of the new document. If none of the category profiles is of sufficient similarity, as determined by some threshold criteria, no topic is returned. It is reasonable to assume that documents within a category bear some relevancy to the meeting and would be retrieved for possible use.

The set of topics may be manually defined, such as folders in a hierarchical document management system, or automatically inferred by a document categorization system. Document categorization works in similar ways to document classification. However, instead of trying to find a closest matching topic, document categorization analyzes the distribution of document profiles to find natural groupings using clustering algorithms.

Several different embodiments of the foregoing are possible. For example, a singly content window can be created for the entire meeting or on a per speaker basis. Similarly, query retrieval can be applied to the entire web, a corporate database, or to an individual's document collection on the eCabinet™. Feedback can be configured such that all users receive the same set of documents, or each receive a different set of documents tailored to his preference, or a combination of the two.

Information retrieval from a recorded presentation basicallly follows the same process after applying oprical character recognition ("OCR"). It is worth pointing out some important characteristic about presentation recordings. Slides are usually much more structured than conversation, often having topics and subtopics that are clearly denoted. The appearance of characters on the slides (boldface, color, etc.) generally indicates the importance of such concepts. In addition, OCR performance is typically better than speech recognition and so the output is not as noisy. Slides usually contain short phrases, providing very high information content. Furthermore, the timing on slides provides an explicit window for its context. Based on these characteristics, one would expect more precise retrieval performance from presentations.

Known online handwriting recognition software can be integrated with whiteboard capture devices to provide an additional query input. Since writings on whiteboard may be spotty and contain drawings or other non-character markings, a filter can be used to recognize only a limited number of words. Special keywords such as "print" or "search" may be used to guide the interpretation of subsequent strokes and trigger appropriate actions.

To further improve the performance of speech recognition, OCR results (from a slide presentation, for example) and relevant documents can provide a contextual backdrop for the process. It is well known that speech processing relies heavily on contextual information, such as grammars and dictionaries. Therefore, any information about the context of a meeting can help improve the performance of speech transcription. Because of the highly structured, compact representation of slides, they provide a good source for a domain specific lexicon which can be extracted to assist interpreting meeting content. For example, we often see special terms or acronyms presented in slides. Such information can provide an additional lexicon to a speech recognition engine.

Documents related to meeting attendees can also provide a hint about meeting content. Once the meeting attendees are identified, documents recently read by one or more participants are very likely to be relevant to the discussion.

Figure 8:
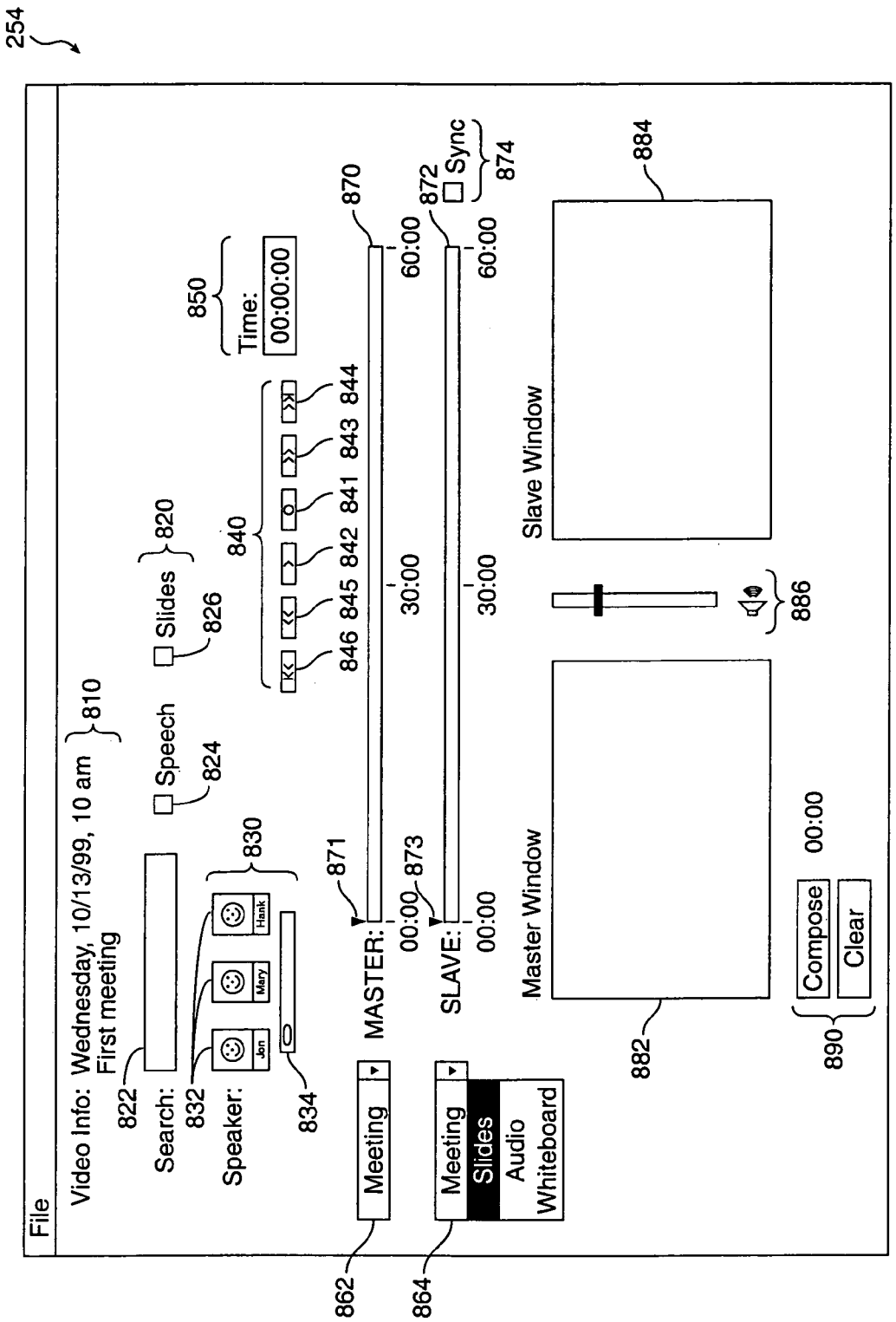
FIG. 8 illustrates a user interface for accessing data captured during a meeting.

Referring to FIG. 8, an embodiment of retrieval interface 254 is shown. FIG. 8 shows in simplified detail an embodiment of a graphical user interface in accordance with the invention. The graphical interface comprises an information area 810. This area displays information such as the time, date and a title associated with the meeting for which the data was captured. Other information can be associated in addition to or instead of the information shown in the embodiment shown in FIG. 8. This area can be made read-only, though area 810 may be selectively write-enabled for authorized users to edit variable information such as the meeting title.

A textual search area 820 provides text searches of the captured data. A search string can be specified via a text box 822. Check boxes for speech 824 and for slides 826 specify where the search is to take place. In one embodiment, the check boxes have a mutually exclusive behavior, namely, only one or the other box can be checked, to limit the search to one or the other of the captured data. In another embodiment, both check boxes 824, 826 can be checked so that the search is done in both of the captured data sources.

A speaker area 830 is provided so that playback of the captured data can be selected based on the selected speaker. This area comprises a series of thumbnail images 832 of each speaker, along with identifying information such as their names. Since there might be a large number of attendees in a given meeting and since the interface has limited area, only so many speakers at a time can be displayed. In the embodiment shown in FIG. 8, three thumbnail images are provided. A slider control 834 allows the user to display other members in the meeting, three at a time by sliding the control in the left and right direction. This action is can be achieved by moving a pointing device such as a mouse, for example, to the slider button and dragging the mouse while "clicking" a mouse button. As the slider is manipulated in this way, the thumbnail images are updated with images of other members. The order of appearance can be alphabetical by name, by rank in the company, by age, and so on.

A playback control area 840 provides graphical metaphors for conventional playback buttons similar to those found on a compact disc player. There is a play button 842 and a stop button 841. A fast forward button 843 plays back the captured data at an accelerated speed. A fast forward-to-end button 844 has a context dependent action. In the case where the captured data is a completed recording, the fast forward-to-end button simply takes the user to the end of the recorded data. In the case where the meeting is still in progress and data capture is still occurring, this button simply takes the user to real time viewing, allowing her to view the data as it is being captured. A rewind button 845 plays the captured data in the reverse direction in an accelerated manner. A rewind-to-the-beginning button 846 takes the user to the beginning of the recording session.

The fast forward and rewind speeds can be varied. In one embodiment, additional controls (not shown) are provided which specify these speeds; e.g. 2×, 4×, and so on. In an alternative embodiment, simply clicking one of the buttons 843, 845 multiple times can effectuate an increase in the fast forward or rewind speed. The speed increases can cycle from 1× speed up to a maximum speed and then drop back to 1× speed.

A time selection area 850 allows a user to enter a time indication to go directly to a specific time in a recorded (or presently recording) meeting. The time specification can be a relative time; i.e., so many minutes into a meeting. Alternatively, the time can be specified by the particular time of the day; i.e., playback of the meeting from 3:30 PM.

In accordance with the invention, retrieval interface 254 allows playback of one data stream, for example video data, in synchrony with playback of another data stream, for example projection data. A master data selector 862 and a slave data selector 864, and a master time scale area 870 and a slave time scale area 874 are provided to facilitate this capability. The master and slave data selectors 862, 864 allow the user to select which captured data will be the "master" and which captured data will be the "slave". The captured data include video recordings, audio recordings, slide presentations, and whiteboard data. Data selectors 862, 864 are dropdown menus which list the captured data available. FIG. 8 illustrates slave data selector 864 with its dropdown menu exposed, showing the list and showing that 'slides captured data' is selected.

Controls 840, in particular fast forward and rewind buttons 843 and 845 respectively, can be used to view the data stream in an event-driven manner. For example, in the case of projection data an event might be the presentation of a new slide. During the display of a whiteboard recording, an event might be the completion of a writing action so that only the final written expression is displayed. In the case of a speech segment, the event might be the silent period of a pause during the discourse in the meeting so that segments of speech can be more easily skipped over.

Time scales 870, 872 indicate the play time during playback. Time indicators 871, 873 move back and forth as the data is forwarded and rewound. A synchronization box 874 provides synchronized playback between the master and slave data when the box is checked. Time indicators 871, 873 can be manipulated by the user as another means by which to control the playback of the captured data, simply by dragging an indicator back and forth. In synchronized mode, dragging either of the time indicators causes playback of both the master and the slave data to advance or reverse in synchrony. If synchronization box 874 is un-checked, then dragging one indicator will not affect the playback action of the other.

A master window 882 and a slave window 884 display the captured data being played back. A volume control 886 is provided for audio playback.

When playback is stopped, the still images in the windows 882, 884 can be "cut" and "pasted" into other documents. Still images can be stored in any of a number of known formats such as JPEG, GIF, bitmap, and so on.

A video clip composition area 890 provides controls for specifying clips of video which can be saved. A video clip of interest is selected by shuttling through the video to specify the desired segment. The "compose" button concatenates the selected segments to produce the video composition. The "clear" button serves as a reset to so that a new video composition can be produced. A time indicator informs the user as to the length of the video clip. The video clips can be saved in any of the known video formats; e.g., MPEG, AV1.

Figure 9:
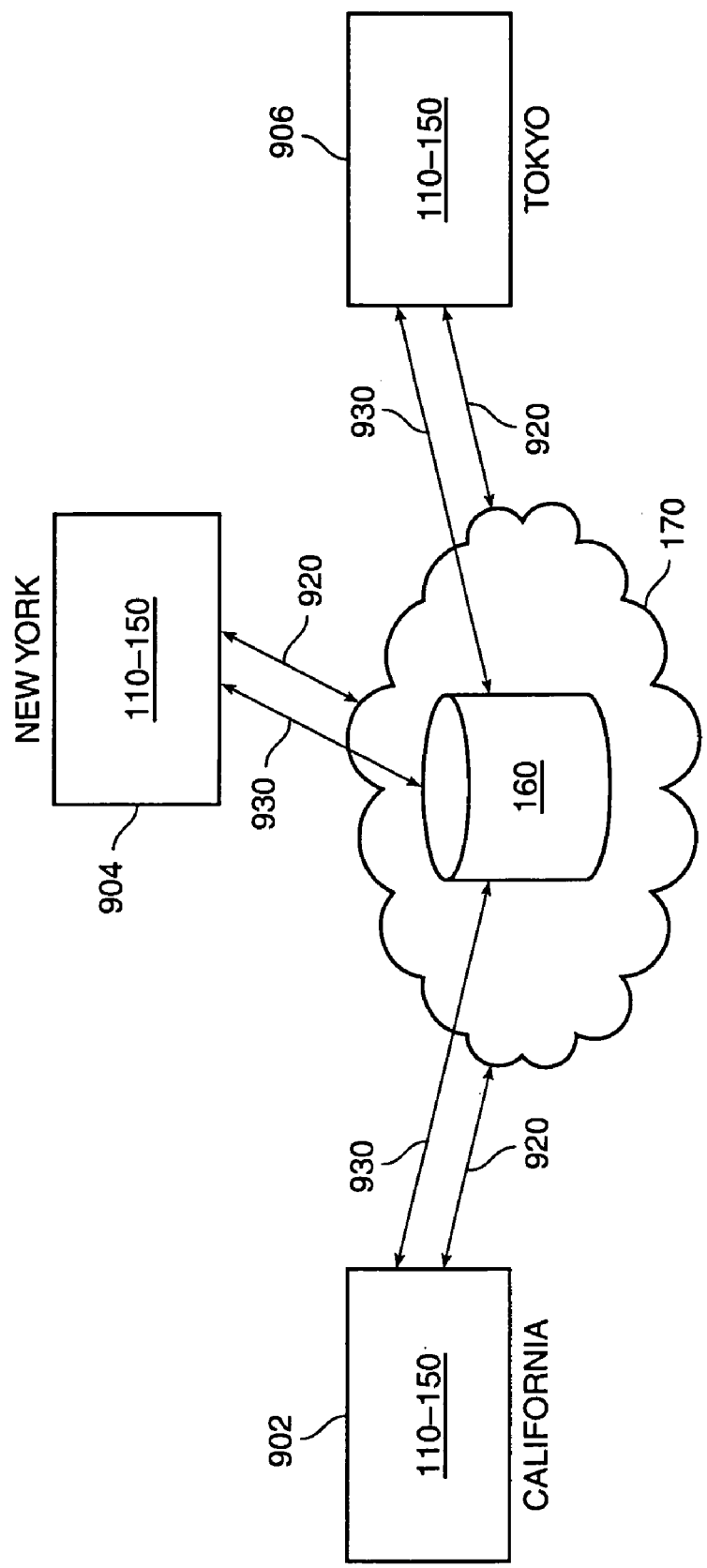
FIG. 9 is schematic representation of a networked configuration of the present invention.

FIG. 9 shows an embodiment of a networked arrangement of the information support system in accordance with the present invention. Here, three instances of support system 100 are provided in three locations around the world, namely, a California site 902, a site in New York 904, and a site in Tokyo 906. Each site shares the same database component 160. In this embodiment, database component 160 is shown contained in communication network 170 to emphasize that the sites share a commonly accessible database component. Any of a number of known data sharing techniques can be used to implement this shared component. In practice, there may be multiple databases using synchronization procedures such as volume shadowing to ensure that each site logically perceives database component 160 as a single database entity. Communication network 170 allows an intranet local to each site to be accessible by the other sites. Appropriate firewall schemes and security measures can be implemented to ensure the secured access to the individual intranets.

A particularly useful meeting paradigm is possible with the architecture of FIG. 9, namely, the 24 hour meeting. The meeting can begin in New York. Participants might generate documents, notes, and so on which are stored in the database. Later in the day, the California site comes on line. Since all aspects of the New York meeting have been recorded and are readily accessible, the California meeting members can quickly come up to speed on the highlights of the meeting and join in on the discussion. As the day comes to end in New York, the meeting can continue in California. As the California site begins to wrap up its efforts, the Tokyo site can join in to continue the effort. The Tokyo members would have complete access to all the notes, whiteboard sketches, presentations and even the comments and contributions of the attendees of the New York and California meetings. The cooperating of the information support systems 902-906 ensure that needed documents and other materials are prepared and ready so that as each site begins its work, a seamless transition of the meeting from one site to the next site.

The figures sometimes show overlapping functionality. For example, data interaction devices are sources of for initiating actions by the inventive information support system; however, analysis of the information from the data capture devices can also result in context-driven initiation of actions. Hence, allocations of functionality among the figures are provided for the purpose of simplifying the explanation of the various aspects of the invention and should not be construed as limiting how the functions are provided. In general, there are no bright line distinctions or intimations as to where the actual functionality is located. Persons of ordinary skill will understand that such specific details are determined by design constraints, the hardware and software that is available at the time, performance considerations, cost considerations, and so forth.

What is claimed is:

1. A computer executable method for managing information during a meeting comprising steps of:
   recording activities among participants during said meeting to produce recorded meeting data;
   analyzing, while said meeting is ongoing, said recorded meeting data absent direct human intervention to identify textual content contained in said recorded meeting data, said textual content indicative of a participant directive representing an action on said information to be performed during said meeting; and
   in response to identifying said participant directive in said recorded meeting data, performing said action represented by said participant directive on said information while said meeting is ongoing,
   thereby facilitating the management of information during said meeting.

2. The method of claim 1 wherein said recorded meeting data includes video recordings and audio recordings.

3. The method of claim 1 wherein said action includes an activity selected from the group consisting of: document management activities, document editing activities, messaging functions, establishing communication with a new meeting participant, and manipulation of said recorded meeting data.

4. The method of claim 3 wherein said document management activity includes accessing said recorded meeting data during said meeting.

5. The method of claim 1 wherein said activities include verbal communication, written communication, presentation of prepared material using a projection system.

6. The method of claim 1 further including ascertaining identities of said participants and selectively effectuating said participant directive based on said identities.

7. The method of claim 1 further including tracking locations of said participants and selectively effectuating said participant directive based on said locations.

8. The method of claim 1 further including locating said participants in different geographic locations.

9. A computer executable method for providing information services during a meeting involving two or more participants comprising steps of:
   producing a continuous video recording of at least one of said participants for the duration of said meeting;
   producing a continuous audio recording of at least one of said participants for the duration of said meeting;
   storing said video and said audio recordings in a data store;
   analyzing, while said meeting is ongoing, either or both of said video recording or said audio recording absent direct human intervention to identify textual content contained therein to detect a participant directive in said textual content representing an action to be performed during said meeting; and
   providing one or more information-related services based on said participant directive,
   thereby providing information-related services based on gestures and vocal utterances made by said participants during said meeting.

10. The method of claim 9 wherein said detecting a participant directive includes receiving participant input from an input device.

11. The method apparatus system of claim 9 wherein said detecting a participant directive is based on the context of the meeting.

12. The method of claim 9 wherein said detecting a participant directive includes detecting an information retrieval cue, said method further including:
   producing certain information based on said information retrieval cue, including accessing said data store to retrieve one or more segments of said video and said audio recordings and accessing one or more databases to retrieve information contained therein; and presenting said certain information to one or more of said participants.

13. The method of claim 12 wherein said detecting an information retrieval cue includes receiving participant input from an input device.

14. The method of claim 12 wherein said presenting certain information is a step of presenting said certain information to less than all of said participants.

15. The method of claim 12 further including tracking locations of said participants, wherein said presenting said certain information is a step of selectively presenting said certain information based on said locations.

16. The method of claim 9 wherein said information services include accessing information, editing information, assimilating information to produce new information, establishing communication with a new participant, transmitting and receiving messages, accessing a global information network, and accessing a local network.

17. The method of claim 16 wherein said messages include electronic mail.

18. The method of claim 9 wherein provision of said information services depends on permissions associated with said participants.

19. The method of claim 18 further including identifying said participants to determine associated permissions.

20. The method of claim 9 further including locating said participants in geographically distinct locations.

21. A system for providing information services during an interaction between two or more participants, comprising:
a video capture component configured to produce a continuous video recording of at least one of said participants;
an audio capture component configured to produce a continuous audio recording of at least one of said participants;
a data storage component containing information, said data storage component in communication with said video and audio capture components and configured to store said video and audio recordings;
a detection component in communication with said video and audio capture components and configured to analyze either or both of said video recordings or said audio recording to identify a participant directive in textual content representing an action to be performed during said interaction; and
a service provision component in communication with said data storage component and configured to provide an information service based on said participant directive,
thereby providing information services during said interaction based on gestures and vocal utterances made by said participants.

22. The system of claim 21 wherein said participant directive is an information retrieval cue, and wherein said service provision component is further configured to retrieve certain information from said data storage component in response to said information retrieval cue and to provide said certain information to said display component.

23. The system of claim 22 wherein said certain information includes said continuous video recording and said continuous audio recording.

24. The system of claim 21 further including a user input portion configured to receive user-provided input data, said detection component further configured to identify a participant directive from said user-provided input data.

25. The system of claim 21 further including a participant identification component, said service provision component being further configured to selectively provide said information service based on identities of one or more of said participants.

26. The system of claim 25 wherein said identities have associated permissions, said service provision component being further configured to selectively provide said information service based on said permissions.

27. The system of claim 25 wherein said participant identification component is configured to provide participant locations, said service provision component being further configured to selectively provide said information service based on said participant locations.

28. The system of claim 21 wherein said information service includes providing access functions over a communication network.

29. The system of claim 28 wherein said information service includes data retrieval from a global communication network.

30. The system of claim 28 wherein said information service includes data retrieval from a plurality of web sites.

31. A computer executable method of utilizing plural information sources to enhance information management during a meeting between two or more attendees, comprising:
producing and storing a continuous audio-visual recording of one or more of said attendees, said audio-visual recording comprising a video data component and an audio data component;
extracting and storing textual information from said audio and video data components;
extracting and storing image information from said video data component;
analyzing said textual information or said image information to detect attendee action cues from said audio data component or said video data component;
accessing certain information from said information sources based on said attendee action cues; and
presenting said certain information,
thereby providing information services during said meeting on the basis of the actions of said attendees.

32. The method of claim 31 wherein said accessing certain information includes searching through said audio-visual recording.

33. The method of claim 31 wherein said detecting attendee action cues includes receiving explicit commands from an attendee.

34. The method of claim 31 further including tracking locations of said attendees, said presenting certain information being based on said locations.

35. The method of claim 31 further including editing information in said information sources based on said attendee action cues; and producing new information by assimilating portions of information in said information sources based on said attendee action cues.

36. The method of claim 31 further includes identifying said attendees from said audio and video data components to produce attendee identifiers.

37. The method of claim 36 further including manipulating information in said information sources based on said attendee action cues and said attendee identifiers.

38. The method of claim 37 wherein said manipulating information includes editing said information.

39. The method of claim 31 further including locating said attendees in different parts of the world.

40. A system to facilitate the management of information during a meeting between two or more attendees, comprising:
an information storage portion configured to receive and store information and to access and provide information;
an audio-visual capture portion in communication with said information storage portion and configured to produce real-time video recordings and real-time audio recordings of one or more of said attendees;

a text classification portion in communication with said information storage portion and configured to produce and store textual information extracted from said audio and video recordings;

an image classification portion in communication with said information storage portion and configured to produce and store image information in said video recordings;

a cue detection portion configured to detect attendee action cues from said textual information during said meeting;

an information retrieval portion in communication with said information storage portion and configured to access information therefrom based on said attendee action cues;

an information manipulation portion in communication with said information storage portion and configured to manipulate information stored therein based on said attendee action cues; and an information presentation portion operatively coupled to said information retrieval portion and said information manipulation portion and configured to display retrieved and manipulated information, wherein information including said textual information and said image information can be retrieved and manipulated by gestures and voice input of said attendees during said meeting.

41. The system of claim 40 further including an attendee identification portion coupled to said information storage portion and configured to identify said attendees from said audio and video recordings and to provide attendee identifiers.

42. The system of claim 41 wherein said information presentation portion is further configured to selectively display said retrieved and manipulated information to attendees depending on said attendee identifiers.

43. The system of claim 40 wherein said attendee action cues include directives to access said video and audio recordings of said meeting.

44. The system of claim 40 wherein said cue detection portion is further configured to detect said attendee action cues on the basis of the context of said meeting.

45. The system of claim 40 further including an attendee tracking portion configured to track movements and locations of said attendees.

46. The system of claim 45 wherein said information presentation portion is further configured to selectively display said retrieved and manipulated information to attendees depending on said attendee identifiers, said attendee cues, and said locations of attendees.

47. The system of claim 45 wherein said attendee identification portion includes creating new identifiers for unknown attendees.

* * * * *